(12) United States Patent
Yuan et al.

(10) Patent No.: US 6,526,477 B1
(45) Date of Patent: Feb. 25, 2003

(54) HOST-MEMORY BASED RAID SYSTEM, DEVICE, AND METHOD

(75) Inventors: Joe J. Yuan, San Jose, CA (US); Jimmy S. Lie, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/389,954

(22) Filed: Sep. 3, 1999

(51) Int. Cl.$^7$ ............................................. G06F 12/00
(52) U.S. Cl. ......................... 711/114; 711/114; 710/52
(58) Field of Search ............................ 711/114; 710/52

(56) References Cited

U.S. PATENT DOCUMENTS 5,848,076 A * 12/1998 Yoshimura ............... 714/763
6,009,547 A * 12/1999 Jaquette et al. ........... 714/758
6,151,640 A * 11/2000 Herbert ....................... 710/22

* cited by examiner

Primary Examiner—Do Hyun Yoo
Assistant Examiner—Mehdi Namazi
(74) Attorney, Agent, or Firm—Martine & Penilla, LLP

(57) ABSTRACT

A host-memory based RAID system, device, and method are provided. The host computer has a host memory for storing data and parity data and is coupled to a RAID system, which includes a RAID array and a RAID controller. The RAID array includes a plurality of disk drives for storing first data and first parity data. The RAID controller is coupled to the RAID array for interfacing the disk drives of the RAID array with the host computer. The RAID controller receives new data from the host memory for storage in the RAID array and is configured to generate new parity data by performing one or more XOR operations. The host memory is configured to include an XOR buffer for storing the result of the one or more XOR operations. Other configurations include a RAID-enabled SCSI device that includes a SCSI controller and a RAID accelerator.

27 Claims, 8 Drawing Sheets

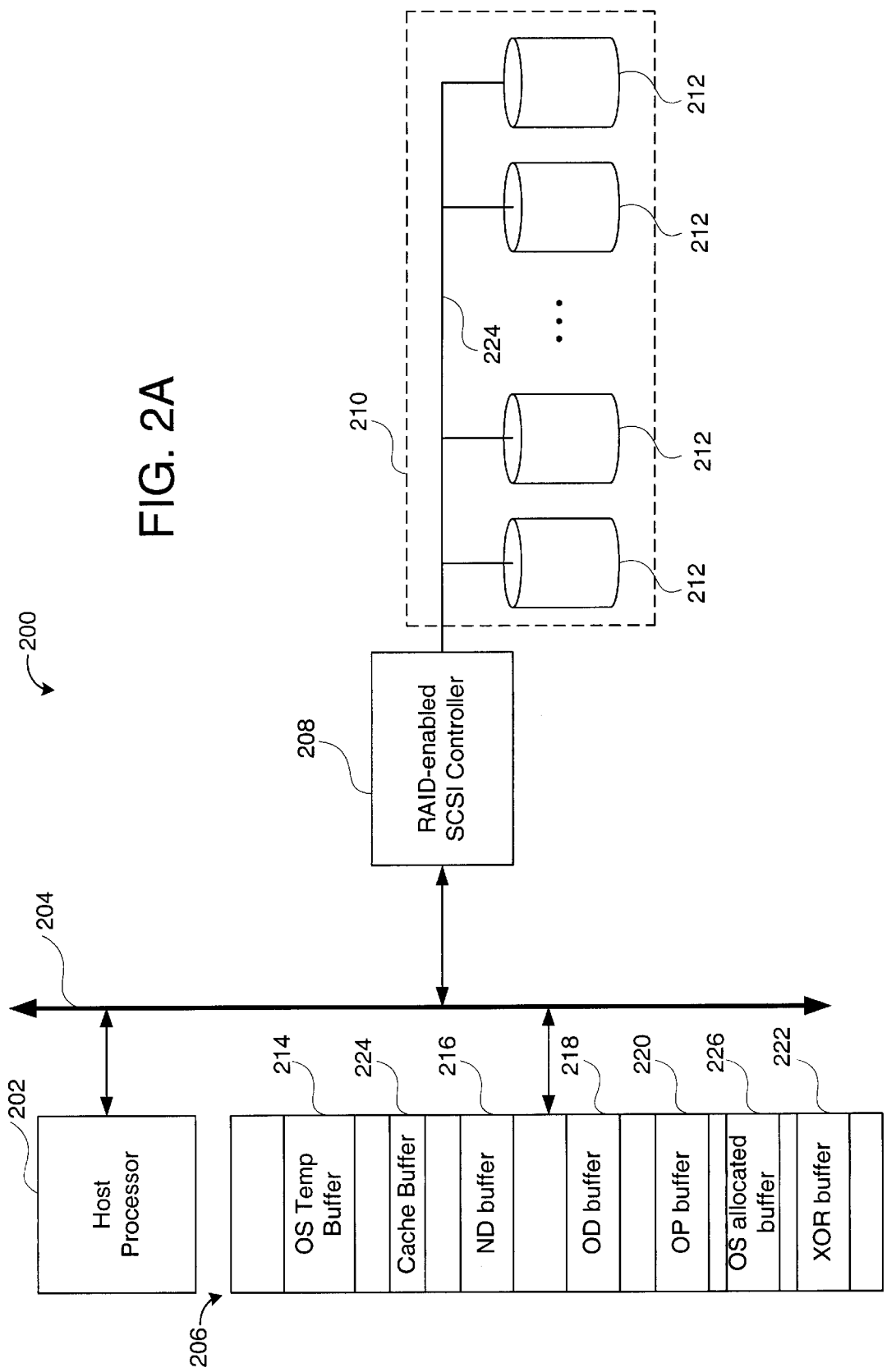

HOST-MEMORY BASED RAID SYSTEM, DEVICE, AND METHOD

BACKGROUND OF THE INVENTION

1. Field of the Invention

This invention relates generally to RAID systems, and more particularly to RAID systems that provide RAID functions by utilizing the memory of a host computer system.

2. Description of the Related Art

Since the inception of computers, data protection has been one of the main concerns in designing data storage systems. Valuable data stored in hard drives can be lost due to abnormal occurrences such as human errors, equipment failures, and adverse environmental conditions. With the advent of on-line, interactive computing, the protection of data has become an even more important consideration in designing data storage systems. For example, modern e-commerce enables companies to conduct all or sizable portion of their business over the Internet using computers. In such scenario, if hard drives on a company's server computer fail, the company's business may come to a standstill. This may lead to a substantial loss in business and goodwill to its customers.

To guard against such disastrous events and enhance I/O performance, many computer systems implement a Redundant Array of Independent Disk (RAID) system, which is a disk system that includes a collection of multiple disk drives and an array controller. The disk drives are organized into a disk array and managed by the common array controller. The array controller presents the array to the user as one or more virtual disks. Disk arrays are the framework to which RAID functionality is added in functional levels to produce cost-effective, highly available, high-performance disk systems.

In RAID systems, data is distributed over multiple disk drives to allow parallel operation, thereby enhancing disk access performance and providing fault tolerance against drive failures. Currently, a variety of RAID levels (e.g., RAID level 0 through level 6) has been specified in the industry. For example, RAID level 5 architecture provides enhanced performance by striping data blocks among N disks and provides fault-tolerance by using 1/N of its storage for parity blocks, which are typically calculated by taking the exclusive-or (XOR) results of all data blocks in the parity disks row. The I/O bottleneck is thus reduced because read and write operations are distributed across multiple disks. RAID systems are well known in the art and are amply described, for example, in *The RAID Book, A storage System Technology Handbook*, by Paul Massiglia, 6th Ed. (1997), which is incorporated herein by reference.

FIG. 1A illustrates a schematic block diagram of a conventional computer system 100 having a dedicated-memory RAID system. The computer system 100 includes a host processor 102, a primary PCI bus 104, a host memory 106, a host adapter card 120, and a RAID array 112. The host processor 102 is coupled to the PCI bus 104 for processing information such as data and instructions. The memory 106 is also coupled to the bus 104 for storing and providing information for the processor 106.

The primary PCI bus 122 is commonly known as a host bus, to which peripheral devices can be connected to provide additional functionality. For example, as shown in FIG. 1, the RAID array 112, which is comprised of a plurality of disk drives 118, is coupled to the PCI bus 122 through the host adapter card 120. The host adapter card 120 is configured to interface and control access to the RAID array 112 and includes a PCI-PCI bridge 108, a secondary PCI bus 122, a PCI-SCSI controller 110, a RAID accelerator 114, and a dedicated memory 116.

In the host adapter card 120, the PCI-PCI bridge 108 is coupled to the PCI-SCSI controller 110 and the RAID accelerator 114 via the secondary PCI bus 122. The PCI-PCI bridge 108 is a well known device that is used to connect the primary PCI bus 104 with the secondary PCI bus 122 for transmitting from one bus to the other. The PCI-SCSI controller 110 is coupled to interface with the disk array 124 through a peripheral SCSI bus 124 and controls access to the individual disk drives 118.

The RAID accelerator 114 is coupled to the dedicated memory 116 and accesses the dedicated memory to facilitate generation of parity data for storage in the disk array 124. In addition, the RAID accelerator 114 uses the dedicated memory for performing error correction coding (ECC) including encoding and decoding for error detection and correction. As can be appreciated, the RAID accelerator 114 includes a memory controller (not shown) for controlling the access to the dedicated memory 116. The PCI-SCSI controller and RAID accelerator may be implemented using chips such as AIC7880™ and AIC7815™, respectively, which are available from Adaptec, Inc. of Milpitas, Calif.

FIG. 1B illustrates a conventional method for generating parity data in the RAID system for a RAID 5 partial stripe write operation using the dedicated memory 116. As is well known, in a RAID 5 partial stripe write operation, data is stored as data chunks in data stripes the RAID array 112 and one or more data chunks in a data stripe are modified. By comparison, a full stripe write operation entails accessing all data chunks in a stripe and generating new parity data for the entire stripe before writing to the RAID array 112.

With reference to FIG. 1B, the method begins in operation 152 and proceeds to operation 154, where the RAID accelerator 114 receives new data from a buffer in the host memory 106 and stores the new data in the dedicated memory 116. Then, in operation 156, the new data is copied into an XOR buffer space in the dedicated memory 116. Next, old data and old parity data, which are existing data on the disk array 112, are accessed from the disk array 112, and copied into the XOR buffer space in the dedicated memory 116 in operation 158. Once the new data, old data, and old parity data have been loaded into the dedicated memory 116, the RAID accelerator 114 accesses the stored data, in operation 160, to perform XOR operation to generate new parity data. The new data and new parity data are then stored into the disk array 112 in operation 162. The method then terminates in operation 164.

Unfortunately, the use of RAID accelerator 114 having its own dedicated memory 116 is costly to implement. For example, the dedicated memory 116 typically requires substantial amount of memory (e.g., eight Megabytes) to implement XOR function. In addition, the use of the dedicated memory 116 requires a memory controller, typically incorporated in the RAID accelerator chip, to control access to the memory 116. Furthermore, the ECC function requires complex circuitry to implement in the RAID accelerator 114. These additional functions thereby drive up the cost of the host adapter card significantly.

In addition, the PCI-PCI bridge 108 typically includes a small buffer for buffering data transmitted from one bus to the other. However, the buffer often causes a bottleneck in communication between the host PCI bus 104 and the secondary PCI bus 122. Hence, the PCI-PCI bridge 108 may often limit the performance of the computer system.

One of the most popular buses is the well known small computer systems interface (SCSI) bus, which is defined in conformity with SCSI protocols (e.g., SCSI-1, SCSI-2, SCSI-3, etc.), which are incorporated herein by reference. The SCSI protocols are designed to provide an efficient peer-to-peer I/O interface between a host computer system and its peripheral devices. A SCSI bus may accommodate a plurality of SCSI devices up to a number equal to the number of data bits in the SCSI bus. For example, the SCSI-2 bus may accommodate up to eight devices, of which one is usually a SCSI host adapter.

Thus, what is needed is a system and method for providing RAID functions in a host adapter card without the high cost and performance limitations of the conventional techniques.

SUMMARY OF THE INVENTION

The present invention fills these needs by providing a low-cost host-memory based RAID system, device, and method. It should be appreciated that the present invention can be implemented in numerous ways, including as a process, an apparatus, a system, a device, a method, or a computer readable medium. Several inventive embodiments of the present invention are described below.

In one embodiment, the present invention provides a host-memory based RAID system coupled to a host computer. The host computer has a host memory for storing data and parity data. The RAID system includes a RAID array and a RAID controller. In this configuration, the RAID array includes a plurality of disk drives for storing first data and first parity data. The RAID controller is coupled to the RAID array for interfacing the disk drives of the RAID array with the host computer. The RAID controller receives new data from the host memory over a bus for storage in the RAID array and is further configured to generate new parity data by performing one or more XOR operations in response to the new data from the host memory and the first data and the first parity data. The host memory in the host computer is configured to include an XOR buffer for storing the result of the one or more XOR operations.

In another embodiment, a RAID-enabled SCSI device provides access to a RAID array having a plurality of disk drives. The disk drives store first data and first parity data. The RAID-enabled SCSI device includes a SCSI controller and a RAID accelerator. Preferably, the SCSI controller and RAID controller chip are integrated into a single chip to reduce the overall cost. The SCSI controller is configured to provide access to the RAID array for reading first data and first parity data from one or more disk drives and for writing new data and new parity data to one or more disk drives. On the other hand, the RAID accelerator is configured to receive the first data, first parity data, and the new data for performing one or more XOR operations to generate the new parity data. The RAID accelerator receives the new data from a host memory coupled to the device via a bus. The RAID accelerator is further configured to use an XOR buffer in the host memory to store the result of the one or more XOR operations. The RAID accelerator transmits the final result of the one or more XOR operations to the host memory for storage in the XOR buffer as the new parity data.

In yet another embodiment, the present invention provides a method for generating parity data for storage in a RAID array. The RAID array has a plurality of disk drives that store first data and first parity data. The method includes: (a) generating a second data to be written to the disk array; (b) writing the second data to a second data buffer in a host memory; (c) accessing the first data and second data for performing a first XOR operation; (d) performing the first XOR operation on the first and second data to generate a first XOR result; (e) accessing the first XOR result and the first parity data for performing a second XOR operation; (f) performing the second XOR operation on the first XOR result and the first parity data to generate a second XOR result; and (g) storing the second XOR result as the new parity data into an XOR buffer in the host memory.

By eliminating the dedicated RAID memory, the present invention provides a cost effective and yet efficient means for implementing RAID system. For example, conventional memory controller function need not be provided for a dedicated memory in the RAID controller. Furthermore, by using the host memory in conjunction with a buffer, the RAID controller dispenses entirely with the conventional ECC processing, which required substantial resources to implement. This is because the data from the host memory 206, which has been subject to ECC processing, can be used directly without further ECC encoding. In addition, the conventional PCI bridge is no longer needed because the RAID controller, being a single chip, presents only a single load to thus bus. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2A illustrates a schematic block diagram of an exemplary computer system having a RAID-enabled SCSI controller that uses a host memory in accordance with one embodiment of the present invention.

DETAILED DESCRIPTION OF THE PREFERRED EMBODIMENTS

Figure 1A:
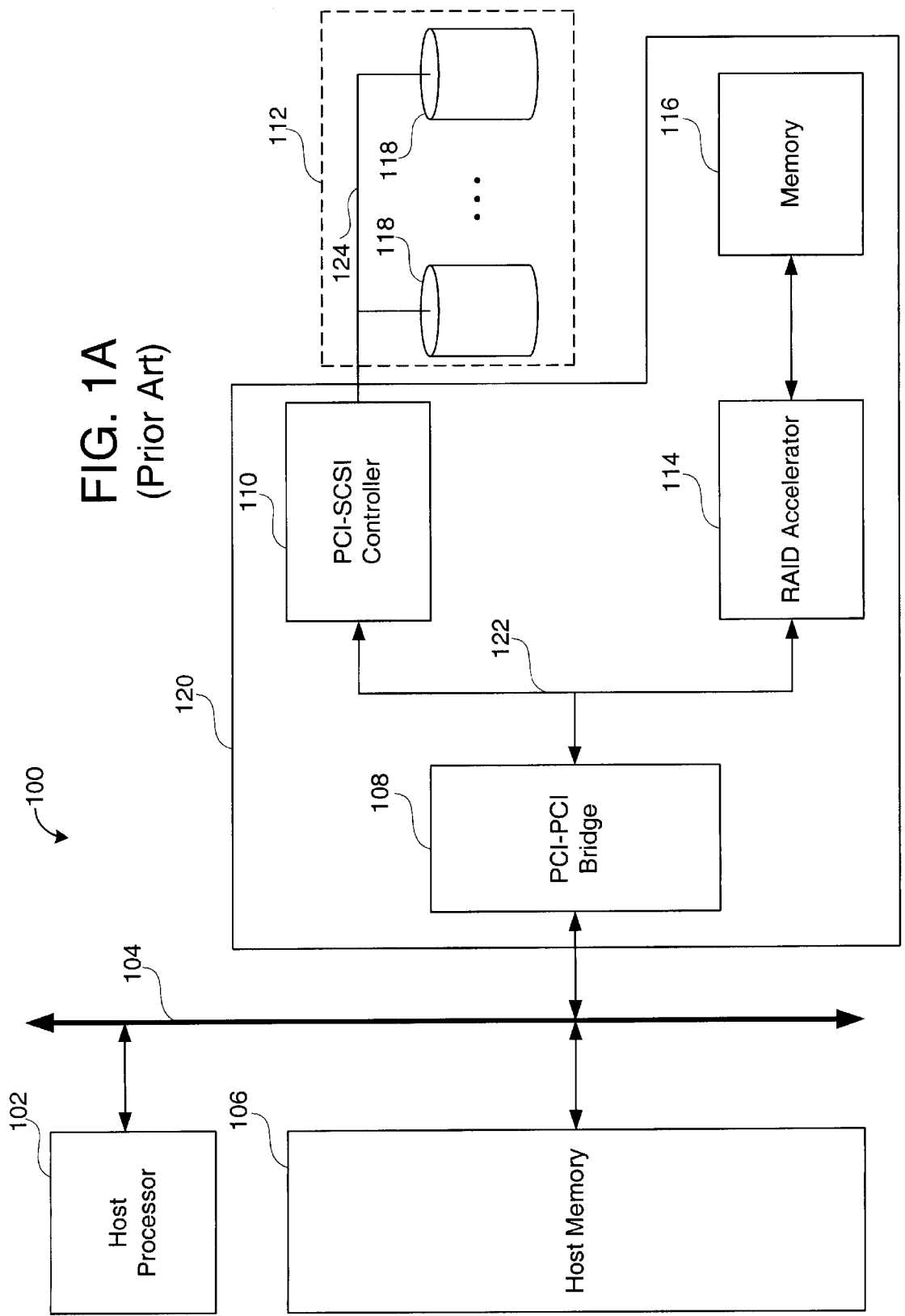
FIG. 1A illustrates a schematic block diagram of a conventional computer system having a dedicated-memory RAID system.
Figure 1B:
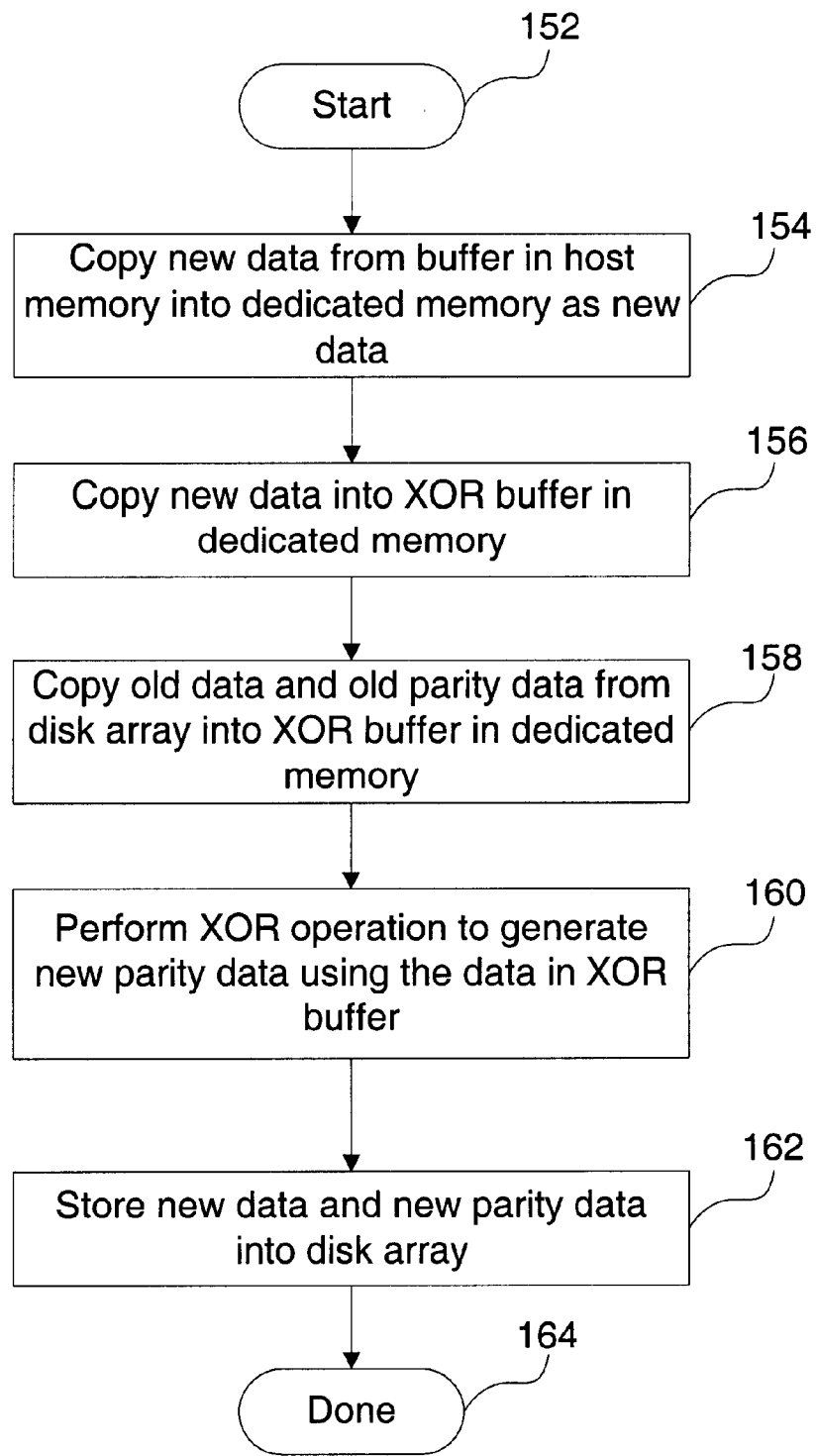
FIG. 1B illustrates a conventional method for generating parity data in the RAID system using the dedicated memory.

The present invention, a host-memory based RAID system, device, and method, is described. It will be obvious, however, to one skilled in the art, that the present invention may be practiced without some or all of these specific details. In other instances, well known process operations have not been described in detail in order not to unnecessarily obscure the present invention.

The present invention provides a host-memory based system, method and device for implementing a RAID system. In particular, the present invention generates parity data by providing an XOR buffer in a host memory (e.g., system memory) of the host computer. The XOR buffer is used to store intermediate and/or final result of XOR operations performed in a RAID-enabled SCSI controller. In one embodiment, the host memory is used to store new data, old data, and old parity data. The RAID-enabled SCSI controller then accesses these data to perform XOR operation for generating new parity data. In another embodiment, the host memory provides new data to the RAID-enabled SCSI controller. The RAID-enabled SCSI controller (e.g., RAID controller) accesses the new data and receives old data and old parity data from a RAID array for performing XOR operation to generate new parity data. As used herein, the term "access" as applied to data refers to gaining access to a storage device as in reading or writing data and is used synonymously with suitable terms such as reading, writing, copying, transferring, and loading.

FIG. 2A illustrates a schematic block diagram of an exemplary computer system 200 having a RAID-enabled SCSI controller 208 that uses a host memory 206 in accordance with one embodiment of the present invention. The computer system 200 includes a host processor 202, a PCI bus 204, the host memory 206, the RAID-enabled SCSI controller 208, and a RAID array 210. The host processor 202 is coupled to the PCI bus 204 for processing information such as data and instructions. The memory 206 is also coupled to the bus 204 for storing and providing information for the processor 206. The primary PCI bus 204 is commonly known as a host bus, to which peripheral devices can be connected via one or more host adapters. Although the present invention is illustrated using PCI bus, it may also employ any suitable buses such as ISA, VESA, AGP, and the like.

The RAID array 210 includes a plurality of disk drives 212, which are coupled to the RAID-enabled SCSI controller 208 through a SCSI bus 224. The RAID-enabled SCSI controller 208 provides functions of SCSI controller and RAID accelerator in a single chip and is configured to interface and control access to the disk drives 212. In one embodiment, the controller 208 is implemented on a peripheral card that can be plugged into the computer system 200. For example, the RAID-enabled SCSI controller 208 can be mounted on a card that is configured to be plugged into a PCI slot provided in the motherboard of the computer system 200.

The RAID-enabled SCSI controller 208 provides interface for connecting the disk drives 212 of the disk array 210, preferably through the SCSI bus 210. However, any other serial or parallel buses may be used to connect the disk drives 212 to the controller 208 suitable to the bus standards implemented in the controller 208.

In contrast to conventional RAID-SCSI host adapters equipped with a dedicated memory, the RAID-enabled SCSI controller 208 of the present invention does not include a dedicated memory. Rather, it uses the host memory 206 of the host computer to generate parity data for storage in the RAID disk array 210. For this purpose, the RAID-enabled SCSI controller 208 is configured to perform XOR operations. As will be described in more detail below, using the host memory 206 instead of a dedicated memory provides an efficient and cost effective means for generating parity data in particular and implementing RAID functions in a SCSI host adapter in general.

To allow the RAID-enabled SCSI controller 208 access to the host memory 206, the memory space in the host memory 206 is allocated. Specifically, a plurality of buffer regions are allocated in the memory 206: an operating system (OS) temporary buffer 214, a new data (ND) buffer 216, an old data (OD) buffer 218, an old parity (OP) buffer 220, and an XOR buffer 222.

The OS temp buffer 214 is used by the operating system to store data generated by an application executing on the processor 202. In the preferred embodiment, the operating system uses the OS temp buffer 214 to store new data (ND) for subsequent storage in the disk array 210. The ND buffer 216 is used to copy and hold the new data from the OS temp buffer 214, which may then be freed to hold other new data.

Similarly, the old data (OD) buffer 218 in the host memory 206 is used to store old data from the disk array 210. Likewise, the old parity (OP) buffer 220 in the host memory 206 is used for storing old parity data from the disk array 210. In one embodiment, the RAID-enabled SCSI controller accesses the data in the buffers 216, 218, and 220 and performs one or more XOR operations. The XOR buffer 222 is used to store the results, either intermediate or final, of the XOR operations.

The RAID-enabled SCSI controller 208 may also be used for cache write operations. In this embodiment, the operating system allocates a buffer 226, which for storing data that is to be written to the disk array 210. Then, when the host processor 202 needs the data, the RAID-enabled SCSI controller 208 retrieves the data from the OS allocated buffer 226. For example, the data may be transferred to an internal buffer (not shown) of the RAID-enabled SCSI controller 208 in specified data size. The controller 208 then transfers the data to a cache buffer 224 in the host memory 206 for use by the host processor 202.

Figure 2B:
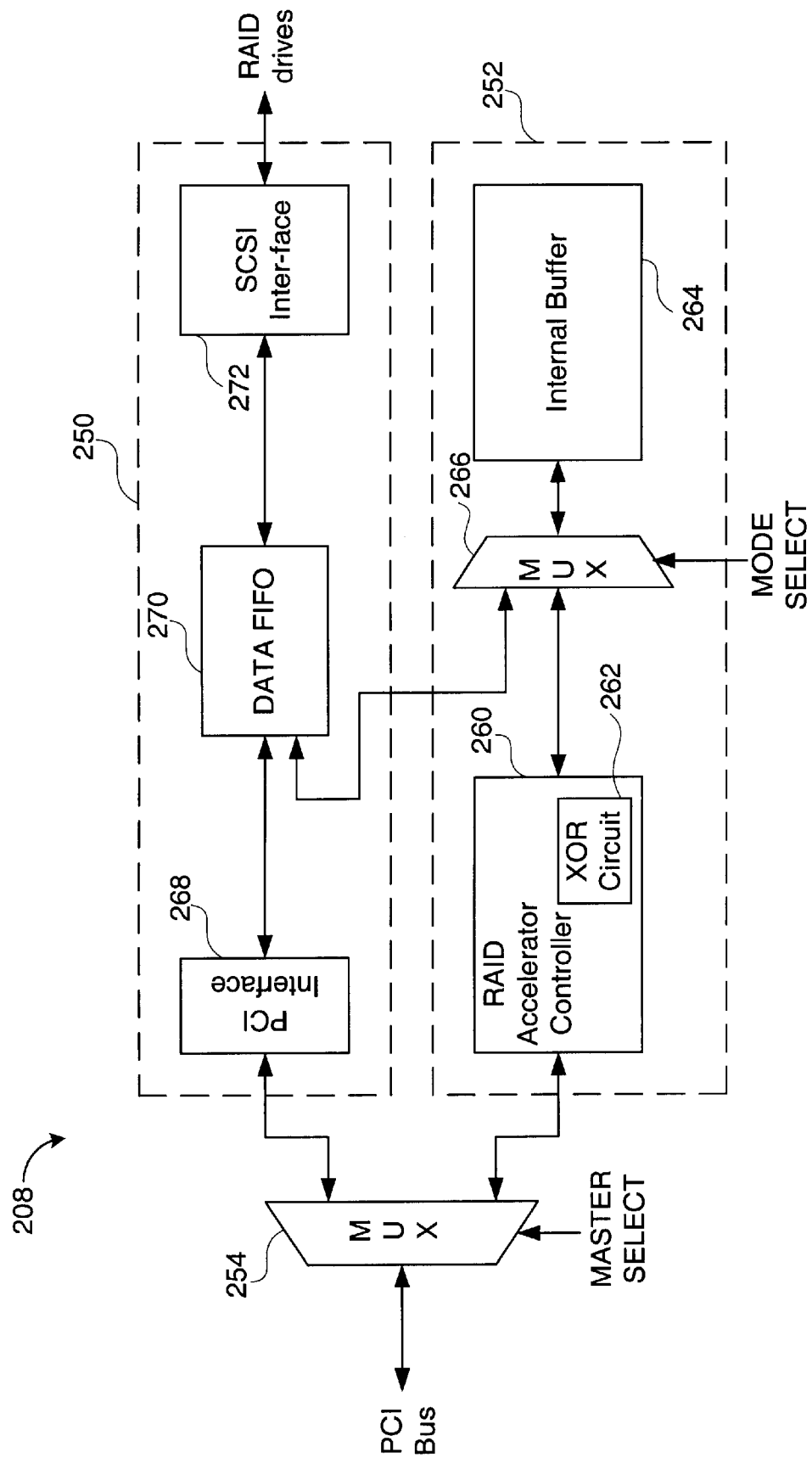
FIG. 2B illustrates a more detailed schematic block diagram of the RAIDenabled SCSI controller in accordance with one embodiment of the present invention.

FIG. 2B illustrates a more detailed schematic block diagram of the RAID-enabled SCSI controller 208 in accordance with one embodiment of the present invention. The RAID-enabled SCSI controller 208 is preferably a single chip that includes a SCSI controller 250 (e.g., SCSI host adapter), a RAID accelerator 252, and a multiplexer (MUX) 254. The multiplexer 254 is in communication with the PCI bus 204 for selecting either the SCSI controller 250 or the RAID accelerator 252 as a PCI bus master in response to a MASTER SELECT signal. For example, when the MASTER SELECT signal indicates transfer of data between the disk array 210 and the host memory, the multiplexer 254 selects the SCSI controller 250 as the PCI master to enable such transfer of data via the PCI bus 204. On the other hand, if the MASTER SELECT signal indicates that data is to be transferred between the host memory 206 and the RAID accelerator 260, then the multiplexer 254 selects the RAID accelerator 252 as the PCI master to enable the data to be transferred.

The SCSI controller 250 includes a PCI interface 268, a data FIFO 270, and a SCSI interface 272. The PCI interface 268 is configured to process data and control signals for communicating data to and from the PCI bus 204. On the other hand, the SCSI interface 272 is configured to process data and control signals for communicating with the SCSI disk drives 212 via SCSI bus. The data FIFO 270 functions as a data buffer and is coupled to transmit data between the PCI and SCSI interfaces 268 and 272 in a first-in-first-out fashion. In this configuration, the data FIFO 270 is configured to store old data and old parity data received from the RAID drives 212 when reading from the RAID drives 212 or new data and new parity data when writing to the RAID drives 212.

For providing enhanced RAID functions, the RAID accelerator 252 includes a RAID accelerator controller 260, an internal buffer 264, and a multiplexer (MUX) 266. The RAID accelerator controller 260 includes an XOR circuit 262 for performing XOR operations, preferably through an XOR gate. The RAID accelerator controller 260 functions to control data flow and operation of XOR circuit 262 and uses the internal buffer 264 for generating parity data. The internal buffer 264 is coupled to the XOR circuit via the multiplexer 266 and is configured to store data such as old data, old parity data, new data, new parity, and/or XOR results of the XOR circuit. The multiplexer 266 is coupled to the RAID accelerator controller 260 and the data FIFO 270 and is responsive to MODE SELECT signal.

As will be discussed below in more detail, the MODE SELECT signal indicates whether the data is to be transferred between the data FIFO 270 and the internal buffer 264 in a redirect mode or between the RAID accelerator controller 260 and the internal buffer 264 in a normal mode. To implement the redirect mode, the data FIFO 270 in the SCSI controller 250 is coupled to the multiplexer 266 of the RAID accelerator 252 for transferring data. In this mode, old data and old parity data from the RAID drives 212 can be loaded into the internal buffer via data FIFO 270 while new data and new parity data may be loaded into the data FIFO 270 from the internal buffer 264 for eventual storage in the RAID drives 212. In the normal mode, on the other hand, data transfer occurs between the RAID accelerator controller 260 and the internal buffer 264 for generating new parity data from old data, old parity data, and new data.

Whereas the size of dedicated memories of conventional RAID systems typically range in the order of several megabytes, the internal buffer is relatively small in size and may range in size from 512 bytes up to the data chunk size in a RAID array stripe, which may range in size from 4 to 64 Kbytes. Typically, RAID stripe sizes exceed the size of the buffer. In such cases, the buffer is used repeatedly to generate piece-wise parity data. For example, given a stripe size of 4 Kbytes and a buffer size of 512 bytes, the buffer is accessed eight times to generate the parity data for the stripe.

The relatively small size of the internal buffer allows the buffer to be incorporated directly into the RAID-enabled SCSI controller chip 208 itself to reduce overall cost while enhancing system performance. Furthermore, by eliminating the dedicated memory, the memory controller function need not be provided in the RAID accelerator 252. In addition, by using the host memory in conjunction with the small buffer, the RAID-enabled SCSI controller 208 dispenses entirely with the conventional ECC processing, which required substantial resources to implement. In the present invention, the data from the host memory 206 has already been subject to ECC processing, for example, by a well known host memory controller (not shown). Accordingly, the host-memory based system and method of the present invention provides a cost effective and yet efficient means for implementing RAID system.

Figure 3:
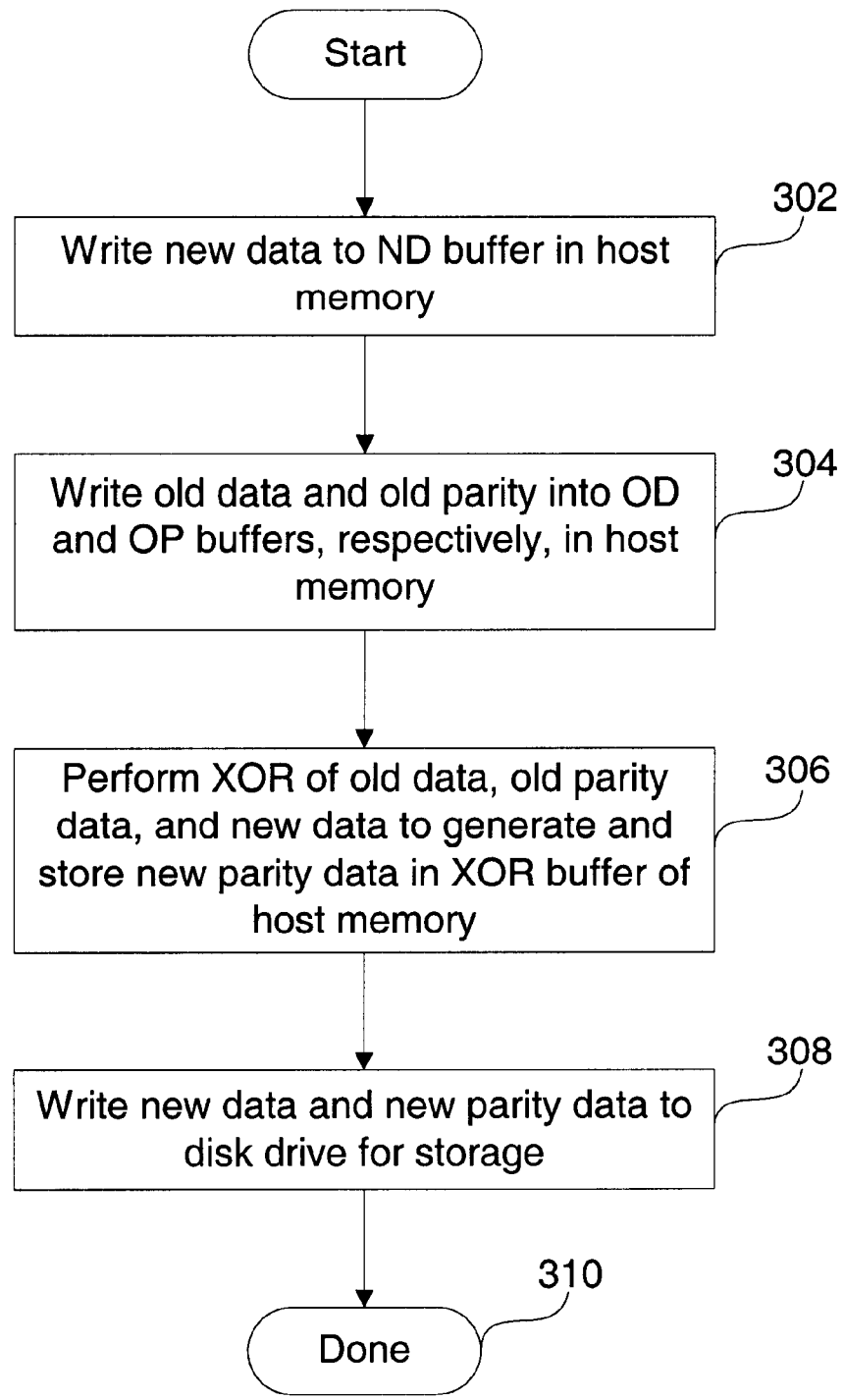
FIG. 3 shows a flowchart of an exemplary method implemented in the computer system for generating new parity data in response to a write command in accordance with one embodiment of the present invention.

FIG. 3 shows a flowchart of an exemplary method implementing a RAID 5 partial stripe write operation in the computer system 200 for generating new parity data in response to a write command in accordance with one embodiment of the present invention. In this method, new data is copied from the OS temp buffer 214 to the ND buffer 216 in operation 302. This allows the operating system to use the temp buffer 214 for other purposes such as modifying the existing data or writing other new data. The RAID-enable SCSI controller 208 then accesses, in operation 304, old data and old parity data in the disk drives 212 in the array 210 and transfers them into the OD buffer 218 and OP buffer 220, respectively, for storage in the host memory 206.

The old data and old parity data in combination with the new data are then used to generate new parity data. Specifically, in operation 306, the controller 208 performs XOR operation on the old data, old parity data, and new data to generate new parity data, which is stored in the XOR buffer of the host memory 106. This operation is discussed in more detail in FIG. 4. Then in operation 308, the new data in the ND buffer 216 and the new parity data in the XOR buffer 222 of the host memory 206 are written to the disk array 210 via the RAID-enabled SCSI controller 208. The method then terminates in operation 310.

Figure 4:
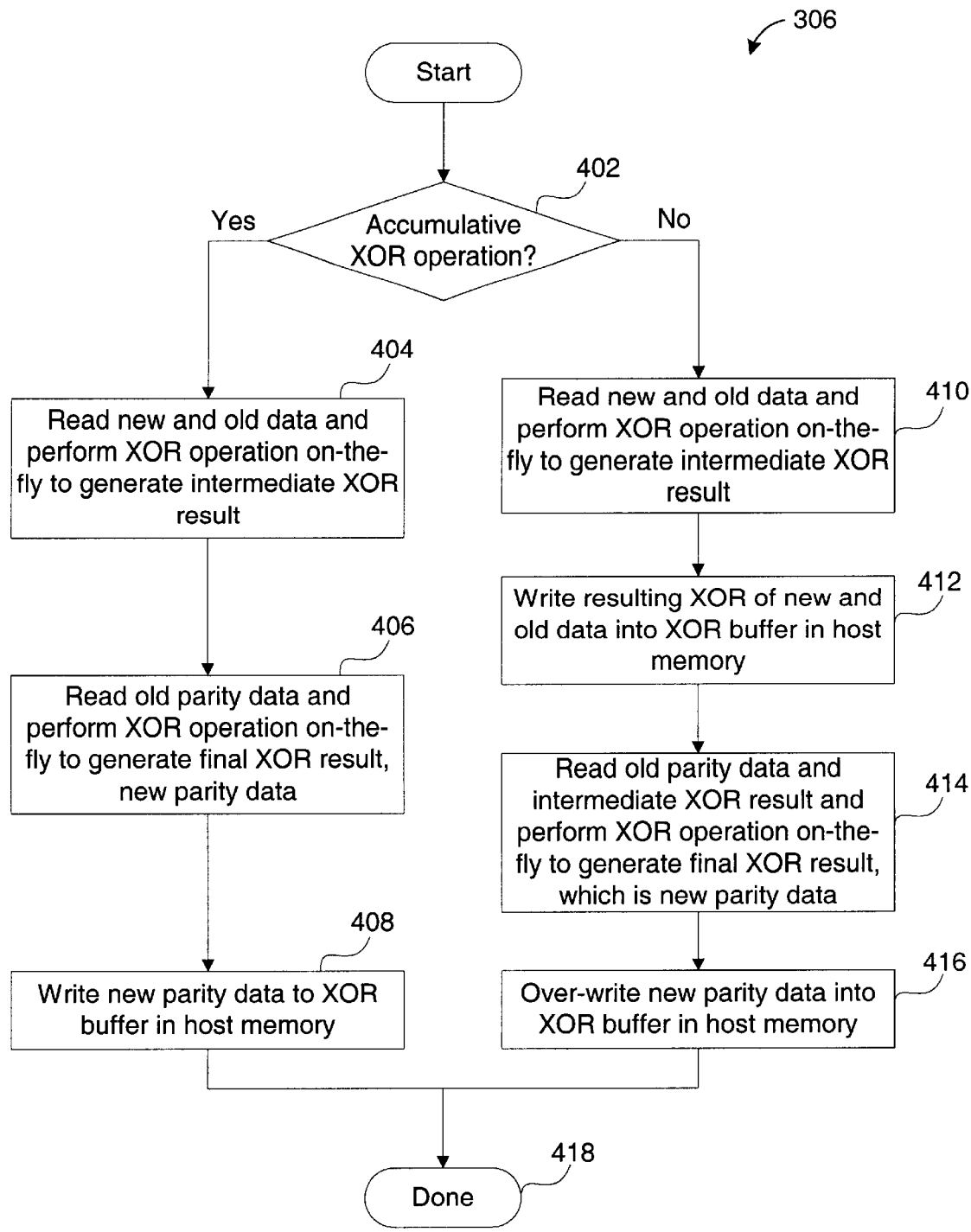
FIG. 4 shows a more detailed flowchart of a method operation performed for generating and storing the new parity data via XOR operations.

The method of FIG. 3 can be used to obtain new parity data by performing either accumulative or non-accumulative XOR operations. FIG. 4 shows a more detailed flowchart of the method operation 306 performed for generating and storing the new parity data via XOR operations. The method begins in operation 402, where it is determined whether the XOR operation will be accumulative or non-accumulative XOR operation. In accumulative XOR operation, the purpose of which is to reduce PCI bus access, the final XOR result is generated by performing XOR operation using the intermediate result of the previous XOR operation as an input. On the other hand, in nonaccumulative XOR operation, which requires more PCI bus accesses than the accumulative XOR operation, the results of XOR operations are not accumulated. Instead, as will be shown in more detail below, intermediate results are stored in the host memory and accessed as needed over the PCI bus.

If it is determined that the XOR operation is accumulative, the method proceeds to operation 404, where the new and old data are read in from the ND buffer 216 and OD buffer 218, respectively. The new and old data are used as inputs to perform XOR operation on-the-fly. The result of this XOR operation is an intermediate result to be used as an input for an ensuing XOR operation. Next, in operation 406, the old parity data is read in from the OP buffer 220 as another input for XOR operation. In response to these inputs, the controller performs XOR operation on-the-fly, in operation 406, to generate final XOR result of old parity data, new parity data, and old data. This final XOR result is the new parity data. The new parity data is then written to the XOR buffer 222 in the host memory for storage.

On the other hand, if it is determined, in operation 402, that the XOR operation is non-accumulative, the method proceeds to operation 410 to perform non-accumulative XOR operation. In this operation, the new data and old data are read in from the ND buffer 216 and the OD buffer, respectively, and are used as inputs for XOR operation. The XOR operation produces an intermediate XOR result, which is then written, in operation 412, to the XOR buffer 222 in the host memory 206. Next, in operation 414, the old data and the intermediate XOR result are read in from the OD buffer 218 and XOR buffer 222, respectively, for use as inputs for XOR operation. That is, an XOR operation is performed on the old data and the intermediate XOR result to generate final XOR result, which is the new parity data. The new parity data thus produced is then written into the XOR buffer 222 in the host buffer in operation 416. In this process, the new parity overwrites previous content of the XOR buffer 222. Upon the completion of either operations 408 or 416, the method terminates in operation 418.

In another embodiment, old data and old parity data are not transferred to the host memory 206 for storage. Instead, the RAID-enabled SCSI controller 208 reads the old data and old parity data from the disk array 210 and transfers the data directly into an internal buffer 264 in the re-direct mode discussed above. By thus accessing the old data and old parity data internally, the number of accesses to the primary bus 204 can be significantly reduced. To implement the current embodiment, the method described in FIG. 3 may be modified to read old data and old parity from the disk drives 212 into the internal buffer 264 provided in the RAID-enabled SCSI controller 208 chip.

Figure 5:
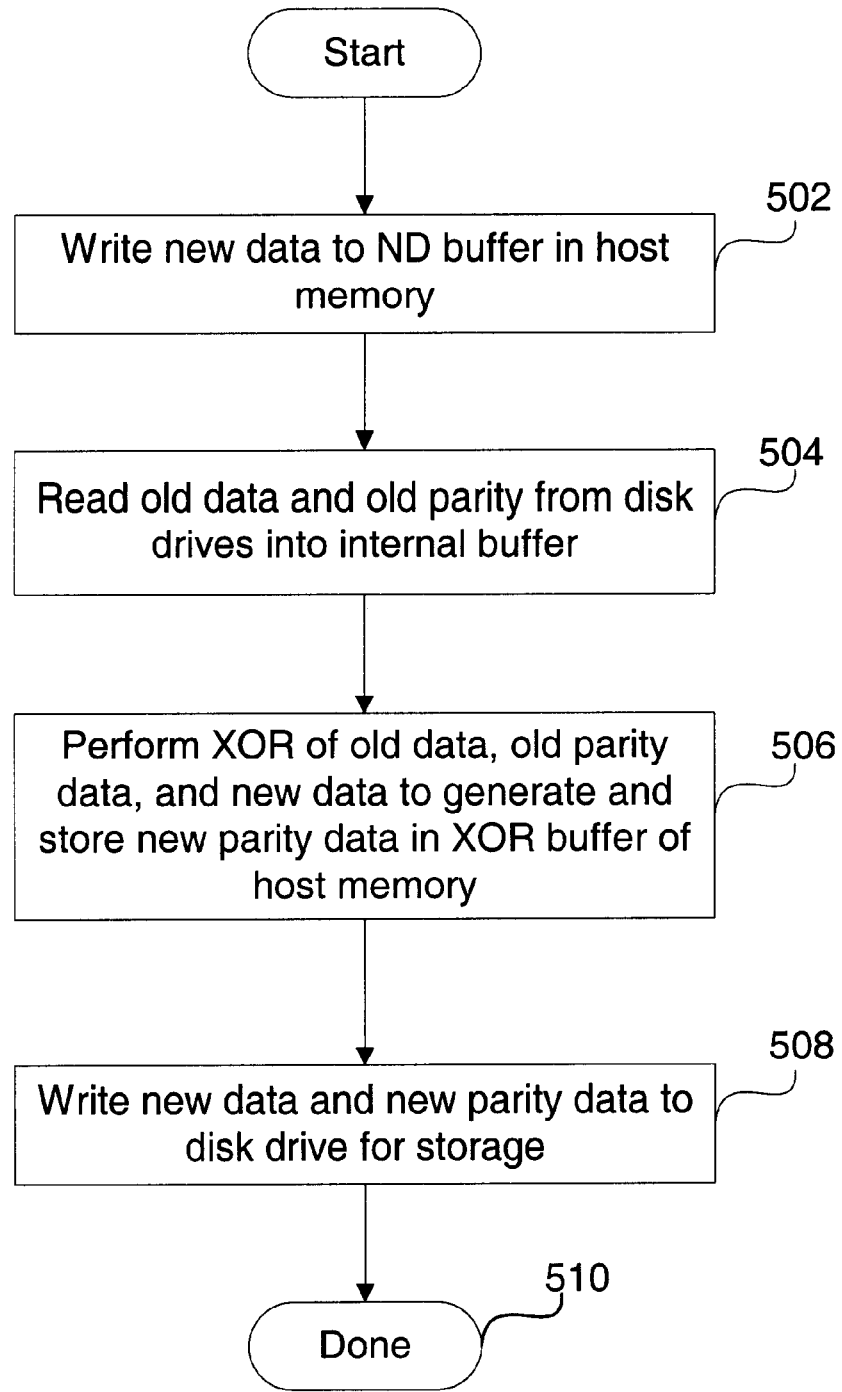
FIG. 5 shows a flowchart of a method for generating new parity data in response to a write command in accordance with another embodiment of the present invention.

For example, FIG. 5 shows a flowchart of a method for generating new parity data in response to a write command in accordance with another embodiment of the present invention. Compared to the method of FIG. 3, the controller 208 in FIG. 5 reads the old data and old parity data directly from the disk drives 212 into internal buffer 264 in operation 504. The controller 208 then generates new parity data by reading in the new data from the host memory 206 and performing XOR operations. Other operations 502 and 508 are performed in a similar manner as the operations 302 and 308 of FIG. 3.

Figure 6:
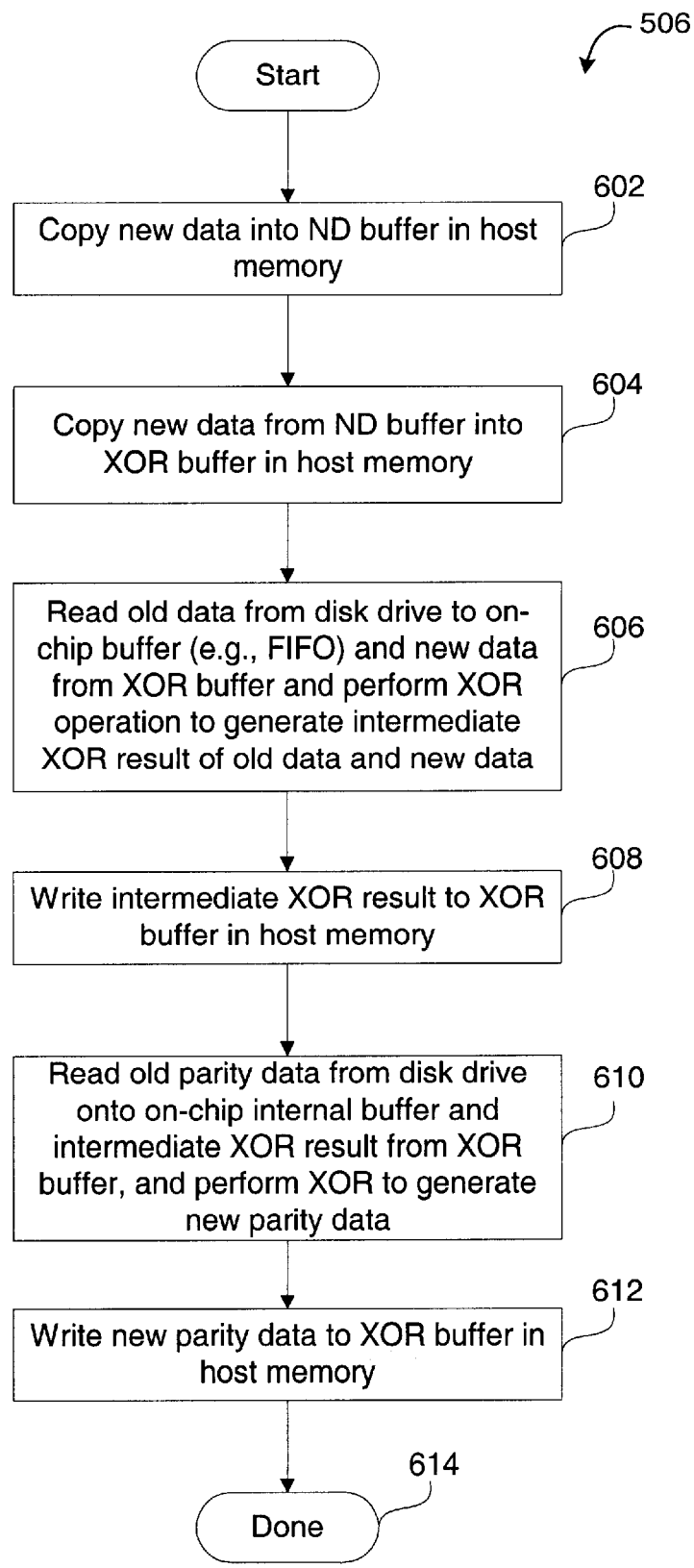
FIG. 6 shows a more detailed flowchart of a method operation for generating and storing new parity data in accordance with one embodiment of the present invention.

FIG. 6 shows a more detailed flowchart of method operation 506 for generating and storing new parity data in accordance with one embodiment of the present invention. The method begins in operation 602, where new data is copied from OS temp buffer 214 into ND buffer 216 in the host memory 206. Then in operation 604, the new data is copied from ND buffer 216 into the XOR buffer 222 in the host memory 206. Next in operation 606, the old data from the disk drive 210 and new data from XOR buffer 222 are read into an internal buffer 264 of the controller 208. When the data have loaded into the internal buffer 264, an XOR operation is performed on the old data and new data from the internal buffer 264 to generate an intermediate XOR result, which is written to the XOR buffer 222 for storage in operation 608.

After the intermediate XOR result has been generated and stored in the XOR buffer 222, the RAID-enabled SCSI controller 208, in operation 610, reads the old parity data from the disk array 210 and the intermediate XOR result from the XOR buffer 222 and stores the data into its internal buffer 264. The controller 208 then performs XOR operation, preferably via XOR circuit 262, based on the intermediate XOR result and old parity data from its internal buffer 264. The XOR operation produces new parity data, which is then written to the XOR buffer 222 in operation 612. The method then terminates in operation 614.

The present invention, host-memory based RAID system, device, and method, is thus described. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A host-memory based RAID system coupled to a host computer, the host computer having a host memory for storing data and parity data, the system comprising:

a RAID array including a plurality of disk drives for storing first data and first parity data; and a RAID controller coupled to the RAID array for interfacing the disk drives of the RAID array with the host computer, the RAID controller receiving new data from the host memory over a bus for storage in the RAID array, and the RAID controller being configured to generate new parity data by performing one or more XOR operations in response to the new data from the host memory and the first data and the first parity data, wherein the host memory is configured to include an XOR buffer for storing the result of the one or more XOR operations.

2. The system as recited in claim 1, wherein the disk drives are SCSI drives and the RAID controller includes a SCSI controller for interfacing the RAID controller with the SCSI drives.

3. The system as recited in claim 1, wherein the RAID controller is further configured to store the generated new parity data in the XOR buffer in the host memory.

4. The system as recited in claim 3, wherein the RAID controller accesses the stored new parity data and the new data in the host memory for storage in the RAID array.

5. The system as recited in claim 1, wherein the RAID controller generates the new parity data by performing XOR operation on the new data, the first data, and the first parity data.

6. The system as recited in claim 1, wherein the host computer stores the new data in the host memory, wherein the RAID controller provides the first data and the first parity data from the RAID array to the host memory for storage, wherein the RAID controller accesses the stored first data and the first parity data along with the new data from the host memory to generate the new parity for storage in XOR buffer in the host memory.

7. The system as recited in claim 6, wherein the new data, the first data, and the first parity data are stored in a new data buffer, an old data buffer, and an old parity buffer, respectively, in the host memory.

8. The system as recited in claim 1, wherein the RAID controller generates the new parity by:

accessing the new data and the first data from the new and old data buffers in the host memory;

performing an XOR operation on the accessed new and first data to generate an intermediate XOR result;

accessing the first data parity from the old data parity buffer in the host memory;

performing an XOR operation on the intermediate XOR result and the accessed first data parity to generate the new data parity; and writing the new parity data to the XOR buffer in the host memory.

9. The system as recited in claim 8, wherein, after generating the intermediate XOR result, the RAID controller writes the intermediate XOR result to the XOR buffer in the host memory for storage, wherein the RAID controller accesses the stored intermediate XOR result from the XOR buffer for generating the new parity data, and wherein the RAID controller writes the new parity data to the XOR buffer in the host memory, thereby overwriting the previous content of the XOR buffer.

10. The system as recited in claim 1, wherein the bus is a PCI bus.

11. The system as recited in claim 1, wherein host memory stores data to be written to the disk array in an operating system allocated buffer, wherein when the processor needs the data from the operating system allocated buffer, the RAID controller receives and transfers the data from the operating system allocated buffer to a cache buffer in the host memory.

12. A RAID-enabled SCSI device for providing access to a RAID array having a plurality of disk drives, the disk drives storing first data and first parity data, the device comprising:

a SCSI controller configured to provide access to the RAID array for reading first data and first parity data from one or more disk drives and for writing new data and new parity data to one or more disk drives;

a RAID accelerator configured to receive the first data, first parity data, and the new data for performing one or more XOR operations to generate the new parity data, the RAID accelerator receiving the new data from a host memory coupled to the device via a bus, the RAID accelerator being configured to use an XOR buffer in the host memory to store the result of the one or more XOR operations, wherein the RAID accelerator transmits a final result of the one or more XOR operations to the host memory for storage in the XOR buffer as the new parity data.

13. The device as recited in claim 12, wherein the SCSI controller and the RAID accelerator are disposed on a single chip that includes a first multiplexer for selecting either the SCSI controller or the RAID accelerator in response to a first select signal, wherein the first select signal allows the first multiplexer to select the SCSI controller when any data is to be transferred between the RAID array and the host memory, and wherein the first select signal allows the first multiplexer to select the RAID accelerator when any data is to be transferred between the RAID accelerator and the host memory.

14. The device as recited in claim 13, wherein the SCSI controller includes a data buffer for storing the first data, first parity data, new data, or new parity data.

15. The device as recited in claim 14, wherein the RAID accelerator includes an internal buffer for storing the first data, first parity data, new data, new parity data, or the result of the one or more XOR operations.

16. The device as recited in claim 15, wherein the RAID accelerator includes an XOR circuit for performing the one or more XOR operations.

17. The device as recited in claim 16, wherein the SCSI controller is adapted to provide the first data and the first parity data to the host memory for storage, wherein the RAID accelerator receives the new data and the first data from the host memory and performs a first XOR operation to generate an intermediate XOR result, wherein the RAID accelerator receives the first parity data and performs a second XOR operation to generate the final result in response to the first parity data and the intermediate XOR result.

18. The device as recited in claim 17, wherein the first and second XOR operations are performed on-the-fly without writing the intermediate XOR result to the host memory.

19. The device as recited in claim 17, wherein the RAID accelerator writes the intermediate XOR result to the XOR buffer in the host memory and reads the intermediate XOR result from the XOR buffer for performing the second XOR operation.

20. The device as recited in claim 16, wherein the SCSI controller is coupled to the RAID accelerator for directly transferring the first data and first parity data without accessing the host memory.

21. The device as recited in claim 12, wherein the bus is a PCI bus.

22. In a computer system, a method for generating parity data for storage in a RAID array, the RAID array having a plurality of disk drives that store first data and first parity data, the method comprising:

generating a second data to be written to the disk array;

writing the second data to a second data buffer in a host memory;

accessing the first data and second data for performing a first XOR operation;

performing the first XOR operation on the first and second data to generate a first XOR result;

accessing the first XOR result and the first parity data for performing a second XOR operation;

performing the second XOR operation on the first XOR result and the first parity data to generate a second XOR result; and storing the second XOR result as the new parity data into an XOR buffer in the host memory.

23. The method as recited in claim 22, further comprising:

storing the new parity data and the new data into the RAID array.

24. The method as recited in claim 22, wherein the operation of accessing the first and second data comprises:

reading the first data from the disk array into a first data buffer in the host memory; and providing the first data and second data from the first data buffer and second data buffer, respectively, in the host memory for performing the first XOR operation.

25. The method as recited in claim 24, wherein the first and second XOR operations are performed on-the-fly without writing the first XOR result to the host memory.

26. The method as recited in claim 24, wherein the operation of accessing the first XOR result and first parity data comprises:

reading the first parity data from the disk array into a first parity buffer in the host memory;

writing the first XOR result into the XOR buffer of the host memory; and providing the first XOR result and the first parity data from the XOR buffer and the first parity buffer, respectively, in the host memory for performing the second XOR operation.

27. The method as recited in claim 22, wherein the first data and the first parity data are provided directly from the disk array for performing the first and second XOR operations without accessing the host memory.

* * * * *